United States Patent
Zhou et al.

(10) Patent No.: US 11,630,892 B2
(45) Date of Patent: Apr. 18, 2023

(54) FINGERPRINT UNLOCKING METHOD AND TERMINAL

(71) Applicant: HUAWEI TECHNOLOGIES CO., LTD., Shenzhen (CN)

(72) Inventors: Jin Zhou, Shanghai (CN); Xi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/041,998

(22) PCT Filed: Mar. 26, 2018

(86) PCT No.: PCT/CN2018/080552
§ 371 (c)(1),
(2) Date: Sep. 25, 2020

(87) PCT Pub. No.: WO2019/183772
PCT Pub. Date: Oct. 3, 2019

(65) Prior Publication Data
US 2021/0042403 A1  Feb. 11, 2021

(51) Int. Cl.
*G06F 21/32* (2013.01)
*G06V 40/60* (2022.01)
(Continued)

(52) U.S. Cl.
CPC .......... *G06F 21/32* (2013.01); *G06V 40/1306* (2022.01); *G06V 40/1365* (2022.01); *G06V 40/63* (2022.01)

(58) Field of Classification Search
CPC .. G06F 21/32; G06K 9/0002; G06K 9/00087; G06K 9/00919; G06K 9/00355;
(Continued)

(56) References Cited

U.S. PATENT DOCUMENTS

2013/0287272 A1* 10/2013 Lu ........................... G06F 3/041
  382/124
2015/0185909 A1* 7/2015 Gecnuk .................. G06F 1/324
  345/174
(Continued)

FOREIGN PATENT DOCUMENTS

CN  104751106 A  7/2015
CN  106535310 A  3/2017
(Continued)

OTHER PUBLICATIONS

XP054981105 Pocketnow: "On-Display fingerprint scanner works great! (Vivo + Synaptics) | Pocketnow", Jan. 11, 2018 (2018), pp. 1-3, XP054981105, Retrieved from the Internet: URL:https:// www.youtube.com/watch? v=DzcvReszexw [retrieved on Nov. 13, 2020].
(Continued)

*Primary Examiner* — Abhishek Sarma
(74) *Attorney, Agent, or Firm* — Rimon PC

(57) ABSTRACT

A fingerprint unlocking method and a terminal are provided. The method may be applied to a terminal having an in-screen fingerprint detection function. When the terminal is in a screen-locked state, the terminal determines whether an operation of a user meets a preset condition. If the operation of the user meets the preset condition, a fingerprint recognition identifier is displayed on a touch display screen of the terminal. A display area of the fingerprint recognition identifier is an area in which fingerprint recognition can be performed. The method resolves a problem that the user cannot perform fingerprint unlocking because the user cannot see a position of a fingerprint detector.

20 Claims, 10 Drawing Sheets

(51) Int. Cl.
*G06V 40/13* (2022.01)
*G06V 40/12* (2022.01)

(58) Field of Classification Search
CPC ........... G06V 40/1306; G06V 40/1365; G06V 40/63; G06V 40/28
See application file for complete search history.

(56) References Cited

U.S. PATENT DOCUMENTS

| | | | | |
|---|---|---|---|---|
| 2015/0235098 A1* | 8/2015 | Lee | ................ | G06K 9/0002 715/709 |
| 2015/0381617 A1* | 12/2015 | Jung | ................ | G06V 40/16 455/411 |
| 2017/0147800 A1* | 5/2017 | Huang | ................ | G06F 21/32 |
| 2017/0285868 A1 | 10/2017 | Gan et al. | | |
| 2017/0351896 A1* | 12/2017 | Jiang | ................ | G06F 21/32 |
| 2019/0019048 A1* | 1/2019 | Deng | ................ | H04L 9/3231 |
| 2019/0228207 A1* | 7/2019 | Roh | ................ | G06K 9/00087 |
| 2019/0251329 A1* | 8/2019 | Jiang | ................ | G06F 21/81 |
| 2020/0081575 A1* | 3/2020 | Li | ................ | G06F 3/0418 |
| 2020/0125229 A1 | 4/2020 | Xu et al. | | |

FOREIGN PATENT DOCUMENTS

| | | |
|---|---|---|
| CN | 106716431 A | 5/2017 |
| CN | 106775150 A | 5/2017 |
| CN | 107015756 A | 8/2017 |
| CN | 107025438 A | 8/2017 |
| CN | 107194226 A | 9/2017 |
| CN | 107688734 A | 2/2018 |
| WO | 2015000406 A1 | 1/2015 |

OTHER PUBLICATIONS

Wang Kun, Multimedia Technology and Application, 2007, 5 pages (with an English abstract).

* cited by examiner

| 8 | 2 | 2 | 0 | 2 | 4 | 4 | 10 | 18 | 14 | 4 | 4 | 4 | 6 | 6 | 6 |
|---|---|---|---|---|---|---|----|----|----|---|---|---|---|---|---|
| 0 | 0 | 0 | 0 | 0 | 0 | 0 | 0 | 0 | 0 | 0 | 0 | 0 | 0 | 0 | 0 |
| 12 | 3 | 3 | 0 | 3 | 6 | 6 | 15 | 27 | 21 | 6 | 6 | 6 | 9 | 9 | 9 |
| 4 | 1 | 1 | 0 | 1 | 2 | 2 | 5 | 9 | 7 | 2 | 2 | 2 | 3 | 3 | 3 |
| 8 | 2 | 2 | 0 | 2 | 4 | 4 | 10 | 18 | 14 | 4 | 4 | 4 | 6 | 6 | 6 |
| 12 | 3 | 3 | 0 | 3 | 6 | 6 | 15 | 27 | 21 | 6 | 6 | 6 | 9 | 9 | 9 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 4 | 1 | 1 | 0 | 1 | 2 | 2 | 5 | 9 | 7 | 2 | 2 | 2 | 3 | 3 | 3 |
| 4 | 1 | 1 | 0 | 1 | 2 | 2 | 5 | 9 | 7 | 2 | 2 | 2 | 3 | 3 | 3 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 12 | 3 | 3 | 0 | 3 | 6 | 6 | 15 | 27 | 21 | 6 | 6 | 6 | 9 | 9 | 9 |
| 0 | 0 | 0 | 0 | 0 | 0 | 0 | 0 | 0 | 0 | 0 | 0 | 0 | 0 | 0 | 0 |
| 8 | 2 | 2 | 0 | 2 | 4 | 4 | 10 | 18 | 14 | 4 | 4 | 4 | 6 | 6 | 6 |
| 0 | 0 | 0 | 0 | 0 | 0 | 0 | 0 | 0 | 0 | 0 | 0 | 0 | 0 | 0 | 0 |
| 8 | 2 | 2 | 0 | 2 | 4 | 4 | 10 | 18 | 14 | 4 | 4 | 4 | 6 | 6 | 6 |
| 4 | 1 | 1 | 0 | 1 | 2 | 2 | 5 | 9 | 7 | 2 | 2 | 2 | 3 | 3 | 3 |
| 8 | 2 | 2 | 0 | 2 | 4 | 4 | 10 | 18 | 14 | 4 | 4 | 4 | 6 | 6 | 6 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 12 | 3 | 3 | 0 | 3 | 6 | 6 | 15 | 27 | 21 | 6 | 6 | 6 | 9 | 9 | 9 |
| 28 | 7 | 7 | 0 | 7 | 14 | 14 | 35 | 63 | 49 | 14 | 14 | 14 | 21 | 21 | 21 |
| 28 | 7 | 7 | 0 | 7 | 14 | 14 | 35 | 63 | 49 | 14 | 14 | 14 | 21 | 21 | 21 |
| 24 | 6 | 6 | 0 | 6 | 12 | 12 | 30 | 54 | 42 | 12 | 12 | 12 | 18 | 18 | 18 |
| 12 | 3 | 3 | 0 | 3 | 6 | 6 | 15 | 27 | 21 | 6 | 6 | 6 | 9 | 9 | 9 |
| 4 | 1 | 1 | 0 | 1 | 2 | 2 | 5 | 9 | 7 | 2 | 2 | 2 | 3 | 3 | 3 |
| 16 | 4 | 4 | 0 | 4 | 8 | 8 | 20 | 36 | 28 | 8 | 8 | 8 | 12 | 12 | 12 |
| 0 | 0 | 0 | 0 | 0 | 0 | 0 | 0 | 0 | 0 | 0 | 0 | 0 | 0 | 0 | 0 |
| 4 | 1 | 1 | 0 | 1 | 2 | 2 | 5 | 9 | 7 | 2 | 2 | 2 | 3 | 3 | 3 |
| 4 | 1 | 1 | 0 | 1 | 2 | 2 | 5 | 9 | 7 | 2 | 2 | 2 | 3 | 3 | 3 |
| 8 | 2 | 2 | 0 | 2 | 4 | 4 | 10 | 18 | 14 | 4 | 4 | 4 | 6 | 6 | 6 |

FIG. 6(a)

| 15 | 24 | 15 | 12 | 12 | 15 | 15 | 75 | 72 | 30 | 6 | 6 | 15 | 18 | 15 | 12 |
|---|---|---|---|---|---|---|---|---|---|---|---|---|---|---|---|
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 15 | 24 | 15 | 12 | 12 | 15 | 15 | 75 | 72 | 30 | 6 | 6 | 15 | 18 | 15 | 12 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 25 | 40 | 25 | 20 | 20 | 25 | 25 | 125 | 120 | 50 | 10 | 10 | 25 | 30 | 25 | 20 |
| 10 | 16 | 10 | 8 | 8 | 10 | 10 | 50 | 48 | 20 | 4 | 4 | 10 | 12 | 10 | 8 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 30 | 48 | 30 | 24 | 24 | 30 | 30 | 150 | 144 | 60 | 12 | 12 | 30 | 36 | 30 | 24 |
| 15 | 24 | 15 | 12 | 12 | 15 | 15 | 75 | 72 | 30 | 6 | 6 | 15 | 18 | 15 | 12 |
| 0 | 0 | 0 | 0 | 0 | 0 | 0 | 0 | 0 | 0 | 0 | 0 | 0 | 0 | 0 | 0 |
| 55 | 88 | 55 | 44 | 44 | 55 | 55 | 275 | 264 | 110 | 22 | 22 | 55 | 66 | 55 | 44 |
| 130 | 208 | 130 | 104 | 104 | 130 | 130 | 650 | 624 | 260 | 52 | 52 | 130 | 156 | 130 | 104 |
| 85 | 136 | 85 | 68 | 68 | 85 | 85 | 425 | 408 | 170 | 34 | 34 | 85 | 102 | 85 | 68 |
| 40 | 64 | 40 | 32 | 32 | 40 | 40 | 200 | 192 | 80 | 16 | 16 | 40 | 48 | 40 | 32 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 15 | 24 | 15 | 12 | 12 | 15 | 15 | 75 | 72 | 30 | 6 | 6 | 15 | 18 | 15 | 12 |
| 30 | 48 | 30 | 24 | 24 | 30 | 30 | 150 | 144 | 60 | 12 | 12 | 30 | 36 | 30 | 24 |
| 25 | 40 | 25 | 20 | 20 | 25 | 25 | 125 | 120 | 50 | 10 | 10 | 25 | 30 | 25 | 20 |

FIG. 6(b)

| | | | | | | | | | | | | | | |
|---|---|---|---|---|---|---|---|---|---|---|---|---|---|---|
| 25 | 40 | 25 | 20 | 20 | 25 | 25 | 125 | 120 | 50 | 10 | 10 | 25 | 30 | 25 | 20 |
| 30 | 48 | 30 | 24 | 24 | 30 | 30 | 150 | 144 | 60 | 12 | 12 | 30 | 36 | 30 | 24 |
| 15 | 24 | 15 | 12 | 12 | 15 | 15 | 75 | 72 | 30 | 6 | 6 | 15 | 18 | 15 | 12 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 40 | 64 | 40 | 32 | 32 | 40 | 40 | 80 | 90 | 200 | 192 | 90 | 40 | 48 | 40 | 32 |
| 85 | 136 | 85 | 68 | 68 | 85 | 85 | 170 | 180 | 425 | 408 | 180 | 85 | 102 | 85 | 68 |
| 130 | 208 | 130 | 104 | 104 | 130 | 130 | 260 | 280 | 650 | 624 | 280 | 130 | 156 | 130 | 104 |
| 55 | 88 | 55 | 44 | 44 | 55 | 55 | 275 | 264 | 110 | 22 | 22 | 55 | 66 | 55 | 44 |
| 0 | 0 | 0 | 0 | 0 | 0 | 0 | 0 | 0 | 0 | 0 | 0 | 0 | 0 | 0 | 0 |
| 15 | 24 | 15 | 12 | 12 | 15 | 15 | 75 | 72 | 30 | 6 | 6 | 15 | 18 | 15 | 12 |
| 30 | 48 | 30 | 24 | 24 | 30 | 30 | 150 | 144 | 60 | 12 | 12 | 30 | 36 | 30 | 24 |
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 10 | 16 | 10 | 8 | 8 | 10 | 10 | 50 | 48 | 20 | 4 | 4 | 10 | 12 | 10 | 8 |
| 25 | 40 | 25 | 20 | 20 | 25 | 25 | 125 | 120 | 50 | 10 | 10 | 25 | 30 | 25 | 20 |
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 10 | 16 | 10 | 8 | 8 | 10 | 10 | 50 | 48 | 20 | 4 | 4 | 10 | 12 | 10 | 8 |
| 5 | 8 | 5 | 4 | 4 | 5 | 5 | 25 | 24 | 10 | 2 | 2 | 5 | 6 | 5 | 4 |
| 15 | 24 | 15 | 12 | 12 | 15 | 15 | 75 | 72 | 30 | 6 | 6 | 15 | 18 | 15 | 12 |
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 15 | 24 | 15 | 12 | 12 | 15 | 15 | 75 | 72 | 30 | 6 | 6 | 15 | 18 | 15 | 12 |
| 10 | 16 | 10 | 8 | 8 | 10 | 10 | 50 | 48 | 20 | 4 | 4 | 10 | 12 | 10 | 8 |
| 15 | 24 | 15 | 12 | 12 | 15 | 15 | 75 | 72 | 30 | 6 | 6 | 15 | 18 | 15 | 12 |
| 15 | 24 | 15 | 12 | 12 | 15 | 15 | 75 | 72 | 30 | 6 | 6 | 15 | 18 | 15 | 12 |

FIG. 7

FINGERPRINT UNLOCKING METHOD AND TERMINAL

CROSS-REFERENCE TO RELATED APPLICATIONS

This application is a national stage of International Application No. PCT/CN2018/080552, filed on Mar. 26, 2018, which is hereby incorporated by reference in its entirety.

TECHNICAL FIELD

This application relates to the field of terminal technologies, and in particular, to a fingerprint unlocking method and a terminal.

BACKGROUND

With rapid development of a touch display screen, an intelligent terminal having a relatively high screen-to-body ratio (a ratio of an area of a screen to an area of a front panel of a terminal) gradually becomes a mainstream product in the market.

For a terminal using front-facing fingerprint detection, if a fingerprint key is still used, an increase of the screen-to-body ratio is greatly limited. To meet a use habit of a user accustomed to using front-facing fingerprint recognition and ensure that the terminal has a relatively high screen-to-body ratio, a solution is provided according to an in-screen fingerprint detection technology. In-screen fingerprint detection is that a fingerprint detector is placed below the touch display screen, and the user places a finger on the touch display screen above the fingerprint detector to implement fingerprint detection.

In a fingerprint key detection solution, the user may see a position of the fingerprint key and perform detection. However, in an in-screen fingerprint detection solution, the user cannot intuitively determine a position of the fingerprint detector. In a scenario in which the user needs to perform fingerprint recognition, especially when a screen needs to be unlocked with a fingerprint, how to notify the user of the position of the fingerprint detector becomes an urgent problem to be resolved currently.

SUMMARY

Embodiments of this application provide a fingerprint unlocking method and a terminal. The method may be applied to a terminal that uses an in-screen fingerprint detection solution, to display a fingerprint recognition area for a user, so that the user can perform fingerprint recognition.

According to a first aspect, an embodiment of this application provides a fingerprint unlocking method. The method includes:

when a terminal is in a screen-locked state, determining, by the terminal whether an operation of a user meets a preset condition; and if the operation of the user meets the preset condition, displaying a fingerprint recognition identifier on a touch display screen of the terminal, where a display area of the fingerprint recognition identifier is an area in which fingerprint recognition can be performed.

In the foregoing manner, when detecting that the operation of the user may be an operation intended for fingerprint unlocking, the terminal displays the fingerprint recognition identifier in the area in which fingerprint recognition can be performed, so that the user performs fingerprint recognition in the display area. This resolves a problem that the user cannot perform fingerprint recognition because the user cannot see a position of a fingerprint detector.

With reference to the first aspect, in a possible implementation, the operation of the user is that the user touches the touch display screen or performs a floating operation on the touch display screen, and the determining, by the terminal, whether an operation of a user meets a preset condition is:

determining, by the terminal based on a capacitance signal generated by the operation of the user on the touch display screen, whether the capacitance signal is greater than or equal to a capacitance value of a preset threshold, or is less than or equal to the capacitance value of the preset threshold.

With reference to the first aspect, in a possible implementation, the operation of the user is that the user performs a floating operation on the touch display screen, and the determining, by the terminal, whether an operation of a user meets a preset condition is:

determining, by the terminal based on a capacitance signal generated by the operation of the user on the touch display screen, whether a distance between a finger of the user and the touch display screen is less than or equal to a preset threshold.

With reference to the first aspect, in a possible implementation, the operation of the user is that the user touches the touch display screen, and the determining, by the terminal, whether an operation of a user meets a preset condition is:

determining, by the terminal based on a capacitance signal generated by the operation of the user on the touch display screen, whether an area in which a finger of the user touches the touch display screen is in a preset area, where the preset area is the area in which fingerprint recognition can be performed.

With reference to the first aspect, in a possible implementation, the operation of the user is that the user touches the touch display screen or performs a floating operation on the touch display screen, and the determining, by the terminal, whether an operation of a user meets a preset condition is:

determining, by the terminal based on a capacitance signal generated by the operation of the user on the touch display screen, whether a finger of the user slides from an area far away from the area in which fingerprint recognition can be performed toward the area in which fingerprint recognition can be performed.

With reference to the first aspect, in a possible implementation, the operation of the user is an operation of the user on a phone key, and the determining, by the terminal, whether an operation of a user meets a preset condition is:

determining, by the terminal based on a signal generated by the operation of the user on the phone key, whether the user presses an on/off key or a volume key, or whether the user simultaneously presses a volume-up key and a volume-down key.

With reference to the first aspect, in a possible implementation, after the terminal determines that the operation of the user meets the preset condition, the method further includes:

starting, by the terminal, a fingerprint detector.

According to a second aspect, an embodiment of this application further provides a terminal. The terminal includes a processor, a touch display screen, and a fingerprint detector. The fingerprint detector is built in the terminal. The processor is configured to:

when the terminal is in a screen-locked state, determine whether an operation of a user meets a preset condition; and if the operation of the user meets the preset condition, control the touch display screen to display a fingerprint recognition identifier, where a display area of the fingerprint recognition identifier is an area in which fingerprint recognition can be performed.

With reference to the second aspect, in a possible implementation, the operation of the user is that the user touches the touch display screen or performs a floating operation on the touch display screen.

The processor is specifically configured to:

determine, based on a capacitance signal generated by the operation of the user on the touch display screen, whether the capacitance signal is greater than or equal to a capacitance value of a preset threshold.

With reference to the second aspect, in a possible implementation, the operation of the user is that the user performs a floating operation on the touch display screen.

The processor is specifically configured to:

determine, based on a capacitance signal generated by the operation of the user on the touch display screen, whether a distance between a finger of the user and the touch display screen is less than or equal to a preset threshold, or is less than or equal to a capacitance value of the preset threshold.

With reference to the second aspect, in a possible implementation, the operation of the user is that the user touches the touch display screen.

The processor is specifically configured to:

determine, based on a capacitance signal generated by the operation of the user on the touch display screen, whether an area in which a finger of the user touches the touch display screen is in a preset area, where the preset area is the area in which fingerprint recognition can be performed.

With reference to the second aspect, in a possible implementation, the operation of the user is that the user touches the touch display screen or performs a floating operation on the touch display screen.

The processor is specifically configured to:

determine, based on a capacitance signal generated by the operation of the user on the touch display screen, whether a finger of the user slides from an area far away from the area in which fingerprint recognition can be performed toward the area in which fingerprint recognition can be performed.

With reference to the second aspect, in a possible implementation, the operation of the user is that an operation of the user on a phone key.

The processor is specifically configured to:

determine, by the terminal based on a signal generated by the operation of the user on the phone key, whether the user presses an on/off key or a volume key, or whether the user simultaneously presses a volume-up key and a volume-down key.

With reference to the second aspect, in a possible implementation, after determining that the operation of the user meets the preset condition, the processor is further configured to:

enable or disable a fingerprint detector.

BRIEF DESCRIPTION OF DRAWINGS

FIG. 6(a) and FIG. 6(b) are a first schematic diagram of a capacitance signal of a touch display screen according to an embodiment of this application;

FIG. 7 is a second schematic diagram of a capacitance signal of a touch display screen according to an embodiment of this application;

DESCRIPTION OF EMBODIMENTS

The following further describes in detail the embodiments of this application with reference to accompanying drawings.

Because a fingerprint recognition technology is relatively mature and has advantages of high security, a fast recognition speed, a high recognition success rate and the like, the fingerprint recognition technology has been widely applied to intelligent terminals. A user may perform operations such as screen-unlocking and payment through fingerprint recognition instead of password input.

Figure 1:
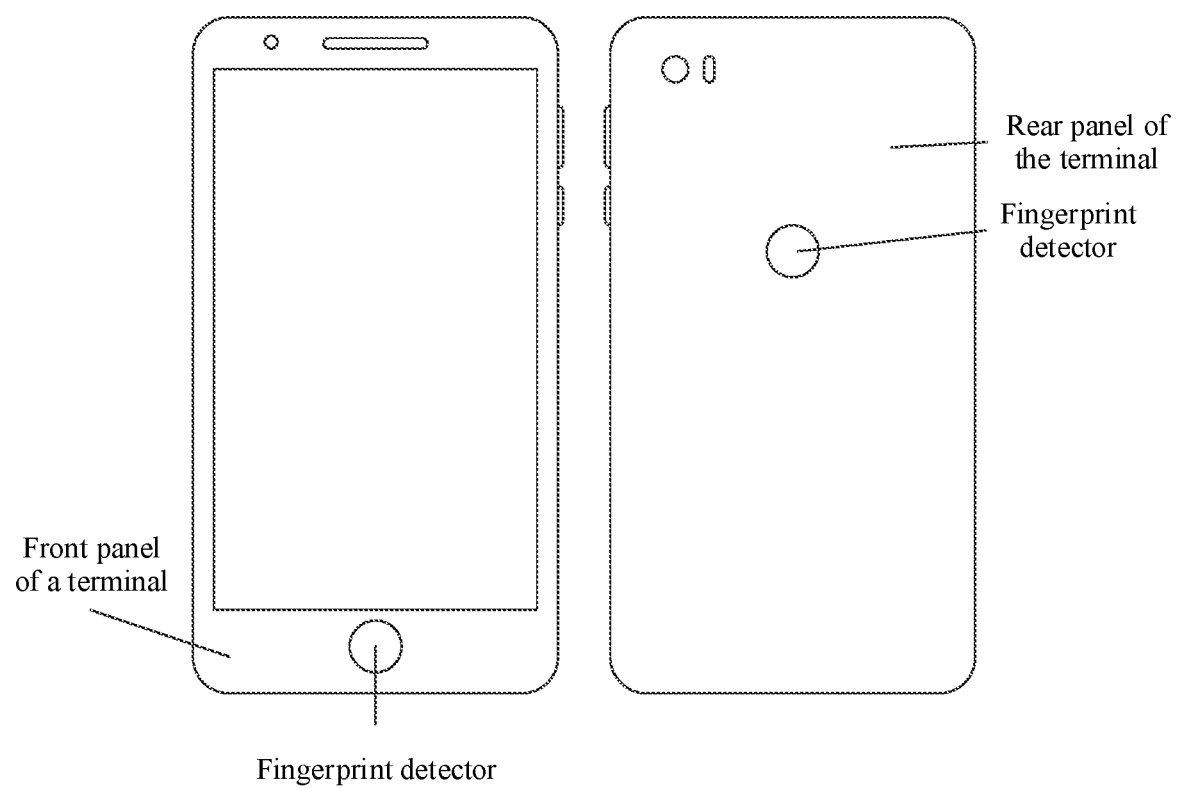
FIG. 1 is a schematic diagram of an appearance of a conventional terminal according to an embodiment of this application.

As shown in FIG. 1, on a conventional terminal, a fingerprint detector may be disposed on a front panel of the terminal, or may be disposed on a rear panel of the terminal. The user may select, based on an operation habit of the user, a terminal with front-facing fingerprint recognition or a terminal with rear-facing fingerprint recognition. When the terminal is in a screen-locked state, an integrated circuit of a touch display screen is usually in a power-off state, namely, a non-working state, but an integrated circuit of the fingerprint detector is in a working state. When the terminal is in the screen-locked state, the user may place a finger on the fingerprint detector, to complete fingerprint recognition and unlock a screen.

With development of terminal technologies, for better visual experience, a screen-to-body ratio gradually becomes a concern of consumers and terminal manufacturers. The screen-to-body ratio is a ratio of an area of the screen to an area of the front panel of the terminal. A higher screen-to-body ratio can provide better visual experience for the user. Therefore, the consumers favor a terminal with a higher screen-to-body ratio.

Figure 2:
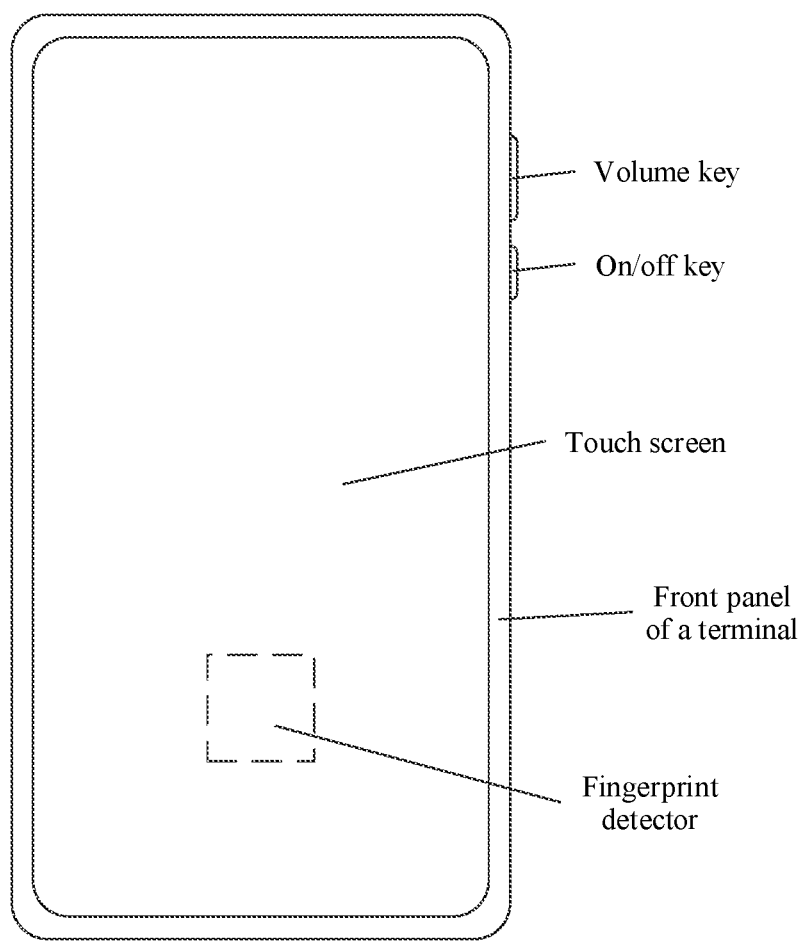
FIG. 2 is a schematic diagram of an appearance of a terminal according to an embodiment of this application.

In a design for increasing the screen-to-body ratio of the terminal, to meet a requirement of a user who prefers to use the front-facing fingerprint recognition, a designer proposes that the fingerprint detector is disposed below a touch display screen panel, that is, in-screen fingerprint detection, as shown in FIG. 2. The user may implement fingerprint recognition by placing the finger on the touch display screen.

However, because the fingerprint detector is disposed below the touch display screen, the user cannot see a position of the fingerprint detector. This is difficult for the user to unlock or perform another operation with a fingerprint.

To resolve the foregoing technical problem, the embodiments of this application provides a fingerprint unlocking method. The method is applied to a terminal that uses an in-screen fingerprint detection solution, to display a fingerprint recognition area for the user, so that the user can perform fingerprint recognition.

The terminal in the embodiments of the present invention may include a mobile phone, a tablet computer, a personal digital assistant (personal digital assistant, PDA), and the like.

Figure 3:
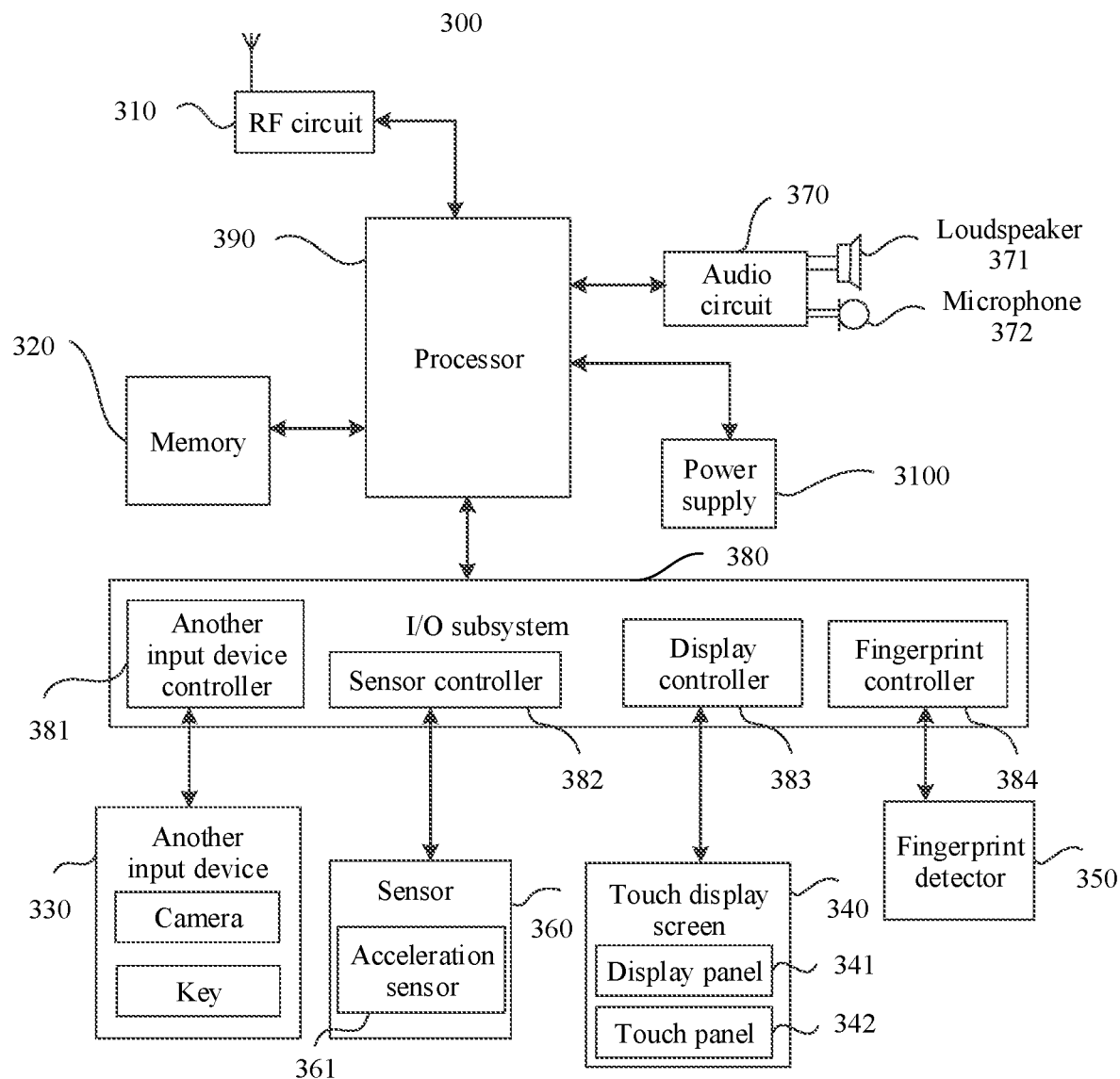
FIG. 3 is a schematic diagram of a structure of a terminal according to an embodiment of this application.

An example in which the terminal is a mobile phone is used. FIG. 3 shows a block diagram of a partial structure of a mobile phone 300 related to an embodiment of the present invention. Refer to FIG. 3. The mobile phone 300 may include components such as a radio frequency (radio frequency, RF) circuit 310, a memory 320, another input device 330, a touch display screen 340, a fingerprint detector 350, a sensor 360, an audio circuit 370, an I/O subsystem 380, a processor 390, and a power supply 3100. A person skilled in the art may understand that the structure of the mobile phone shown in FIG. 3 does not constitute a limitation on the terminal to which the embodiments of this application are applicable. The terminal to which the embodiments of this application are applicable may include more or fewer components than those shown in the figure, or some components may be combined, or some components may be separated, or the components may be disposed in different manners.

The following describes each component of the mobile phone 300 in detail with reference to FIG. 3.

The RF circuit 310 may be configured to send and receive a signal in an information receiving and sending process or a call process. In particular, after receiving downlink information from a base station, the RF circuit 310 sends the downlink information to the processor 390 for processing, and sends related uplink data to the base station. Generally, an RF circuit includes but is not limited to an antenna, at least one amplifier, a transceiver, a coupler, a low noise amplifier (low noise amplifier, LNA), a duplexer, and the like. In addition, the RF circuit 310 may further communicate with a network and another device through wireless communication. The wireless communication may use any communications standard or protocol, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), a fifth generation (the fifth generation, 5G) mobile communications system, an email, a short messaging service (short messaging service, SMS), and the like.

The memory 320 may be configured to store a software program and a module. The processor 390 runs the software program and the module that are stored in the memory 320, to perform various function applications of the mobile phone 300 and data processing. The memory 320 may include a program storage area and a data storage area. The program storage area may store an operating system, an application program required by at least one function (such as a sound playing function or an image playing function), and the like. The data storage area may store data (such as audio data or video data) created based on use of the mobile phone 300, and the like. In addition, the memory 320 may include a high-speed random access memory, and may further include a non-volatile memory, such as at least one magnetic disk storage device, a flash memory device, or another volatile solid-state storage device.

The another input device 330 may be configured to receive input digit or character information, and generate a key signal input related to user setting and function control of the mobile phone 300. Specifically, the another input device 330 may include but is not limited to a function key (such as a volume control key or an on/off key), a camera, and the like. The another input device 330 is connected to another input device controller 381 in the I/O subsystem 380, and exchanges a signal with the processor 390 under control of the another input device controller 381.

The touch display screen 340 may be configured to display information provided for a user or information input by the user and various menus of the mobile phone 300, and may further receive a user input. Specifically, the touch display screen 340 may include a display panel 341 and a touch panel 342. The display panel 341 may be configured in a form of a liquid crystal display (liquid crystal display, LCD), an organic light-emitting diode (organic light-emitting diode, OLED), or the like. The touch panel 342, also referred to as a touchscreen, a touch-sensitive screen, or the like, may collect a touch or non-touch operation (for example, an operation performed by the user on the touch panel 342 or near the touch panel 342 by using any proper object or accessory, such as a finger or a stylus, or may include a motion sensing operation, where the operation includes operation types such as a single-point control operation and a multipoint control operation) of the user on or near the touch panel 342, and drive a corresponding connection apparatus according to a preset program. Optionally, the touch panel 342 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, and then sends the information to the processor 390. In addition, the touch controller may further receive and execute a command sent by the processor 390. Further, the touch panel 342 may cover the display panel 341. The user may perform, based on content displayed on the display panel 341 (the displayed content includes but is not limited to a soft keyboard, a virtual mouse, a virtual key, an icon, and the like), an operation on or near the touch panel 342 that covers the display panel 341. After detecting the operation on or near the touch panel 342, the touch panel 341 sends the operation to the processor 390 by using the I/O subsystem 380 to determine the user input. Then, the processor 390 provides, based on the user input, corresponding visual output on the display panel 341 by using the I/O subsystem 380. In FIG. 3, the touch panel 342 and the display panel 341 serve as two independent components to implement input and input functions of the mobile phone 300. However, in some embodiments, the touch panel 342 and the display panel 341 may be integrated to implement the input and output functions of the mobile phone 300.

The fingerprint detector 350 is configured to recognize a fingerprint of the user, for example, when fingerprint unlocking or fingerprint payment is performed, detect whether the fingerprint input by the user is a valid fingerprint.

The mobile phone 300 may further include at least one sensor 360, for example, an acceleration sensor 361, an optical sensor, and another sensor. Specifically, the acceleration sensor 361 may detect magnitude of accelerations in various directions (usually on three axes), and detect magnitude and a direction of gravity when the acceleration sensor is still, and may be applied to an application for identifying a mobile phone posture (such as screen switching between a landscape mode and a portrait mode, a related game, and magnetometer posture calibration), a function related to vibration recognition (for example, a pedometer, or a knock), and the like. The optical sensor may include an ambient light sensor and a proximity sensor. The ambient light sensor may adjust brightness of the touch display screen 340 based on light and shade of ambient light. The proximity sensor may turn off the screen and/or backlight when the mobile phone 300 moves to an ear. Other sensors such as a gyroscope, a barometer, a hygrometer, a thermometer, and an infrared sensor may be further disposed on the mobile phone 300. Details are not described herein.

The audio circuit 370, a loudspeaker 371, and a microphone 372 may provide an audio interface between the user and the mobile phone 300. The audio circuit 370 may transmit a signal converted from received audio data to the loudspeaker 371, and the loudspeaker 371 converts the signal into a sound signal for outputting. In addition, the microphone 372 converts a collected sound signal into a signal, and the audio circuit 370 converts the signal into audio data after receiving the signal, and then outputs the audio data to the RF circuit 310 to send the audio data to, for example, another mobile phone, or outputs the audio data to the memory 320 for further processing.

The I/O subsystem 380 is configured to control an external input/output device. Optionally, the I/O subsystem 380 may include the another input device controller 381, a sensor controller 382, a display controller 383, and a fingerprint controller 384. Optionally, one or more another input device controllers 381 receive a signal from the another input device 330 and/or send a signal to the another input device 330. The another input device 330 may include a physical button (such as a pressing button), a camera, and the like. It should be noted that the another input device controller 381 may be connected to any one or more of the foregoing devices. The display controller 383 in the I/O subsystem 380 receives a signal from the touch display screen 340 and/or sends a signal to the touch display screen 340. After the touch display screen 340 detects a user input, the display controller 383 converts the detected user input into interaction with a user interface object displayed on the touch display screen 340, to implement human-computer interaction. The sensor controller 382 may receive a signal from one or more sensors 360, and/or send a signal to one or more sensors 360. The fingerprint controller 384 may receive a signal from the fingerprint detector 350 and/or send a signal to the fingerprint detector 350.

As a control center of the mobile phone 300, the processor 390 connects various parts of the entire mobile phone through various interfaces and lines, and performs various functions of the mobile phone 300 and data processing by running or executing the software program and/or the module that are stored in the memory 320 and by invoking data stored in the memory 320, to perform overall monitoring on the mobile phone. Optionally, the processor 390 may include one or more processing units. Optionally, an application processor and a modem processor may be integrated in the processor 390. The application processor mainly processes an operating system, a user interface, an application program, and the like. The modem processor mainly processes wireless communication. It should be understood that the modem processor may not be integrated into the processor 390.

The mobile phone 300 further includes the power supply 3100 (for example, a battery) that supplies power to each component. Optionally, the power supply may be logically connected to the processor 390 by using a power management system, to implement functions such as charging management, discharging management, and power consumption management by using the power management system.

Although not shown, the mobile phone 300 may further include another module such as a Bluetooth module. Details are not described herein.

The following uses the mobile phone 300 as an example to describe in detail the fingerprint unlocking method provided in the embodiments of the present invention.

Figure 4:
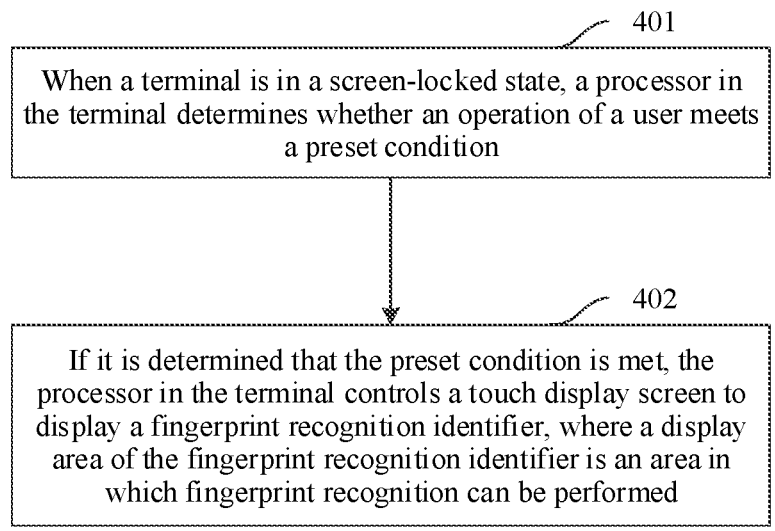
FIG. 4 is a first schematic flowchart of a fingerprint unlocking method according to an embodiment of this application.

FIG. 4 is a schematic flowchart of a fingerprint unlocking method according to an embodiment of this application. As shown in the figure, the method may include the following steps.

Step 401: When the mobile phone 300 is in a screen-locked state, the processor 390 determines whether an operation of a user meets a preset condition.

Step 402: If it is determined that the preset condition is met, the processor 390 controls the touch display screen 340 to display a fingerprint recognition identifier, where a display area of the fingerprint recognition identifier is an area in which fingerprint recognition can be performed, namely, an area in which a fingerprint detector is located.

Figure 5:
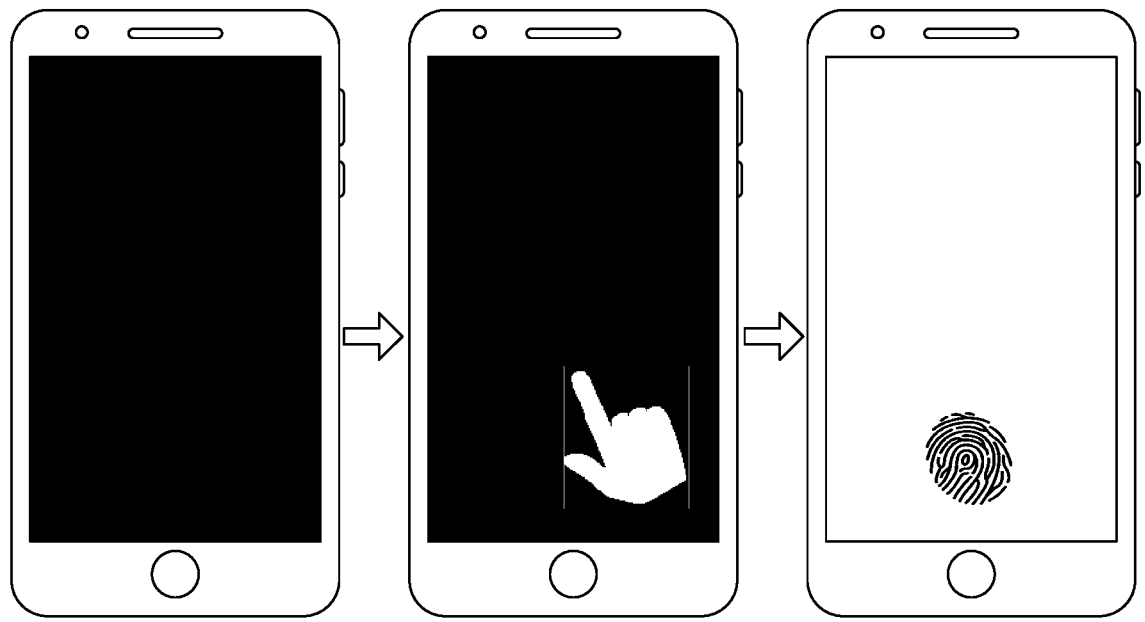
FIG. 5 is a schematic diagram of an effect of a fingerprint unlocking method according to an embodiment of this application.

In the foregoing method, when detecting that the operation of the user may be an operation intended for fingerprint unlocking, the mobile phone 300 displays the fingerprint recognition identifier in the area in which fingerprint recognition can be performed, as shown in FIG. 5, so that the user performs fingerprint recognition in the display area. This resolves a problem that the user cannot perform fingerprint recognition because the user cannot see a position of the fingerprint detector.

Specifically, the screen-locked state may be a screen-off and screen-locked state, or may be a screen-on and screen-locked state. The screen-on and screen-locked state indicates that a touch display screen is turned on, and information such as a date and time may be displayed, but a display screen does not display a home application screen or another application screen. For example, a touch display screen of a mobile phone is usually turned on after an on/off key of the mobile phone is pressed. However, if the user wants to use the mobile phone, the user further needs to perform an unlocking operation to enter the home application screen or the another application screen of the mobile phone.

Optionally, when determining whether the operation of the user meets the preset condition, the mobile phone 300 may determine a non-contact operation of the user, or may determine a contact operation.

The non-contact operation may include a floating operation of a finger of the user within a specific distance above the touch display screen, and may also include an operation such as sound control of the user.

In a possible implementation, the processor 390 in the mobile phone 300 may determine, based on a capacitance signal of the touch display screen 340, whether a floating operation of the finger of the user on the touch display screen 340 meets the preset condition.

As described above, when a conventional terminal is in a screen-locked state, an integrated circuit of a touch display screen is usually in a power-off state, that is, the touch display screen is in a non-working state, and an operation of the user cannot be recognized. However, in the foregoing manner, when the mobile phone 300 is in the screen-locked state, the processor 390 still needs to detect the capacitance signal of the touch display screen 340, to determine the operation of the user.

Specifically, a capacitive touch display screen may be classified into a self capacitive touch display screen and a mutual capacitive touch display screen. A horizontal electrode array and a vertical electrode array are disposed on the self capacitive screen, and these horizontal and vertical electrodes separately form a capacitor with the ground. When the finger touches the screen, or the finger does not touch the screen but a distance between the finger and the screen is within a specific range, a capacitance of the finger is superimposed on a capacitance of the screen, so that a capacitance value of the screen is increased. When detecting an operation of the user, the self capacitive screen separately detects capacitance values of the horizontal electrode array and the vertical electrode array, and separately determines, based on a change in capacitance before and after the user performs the operation on the self capacitive screen, a horizontal coordinate and a vertical coordinate of a position of the operation of the user. A shorter distance between the finger of the user and the touch display screen indicates a higher capacitance value, and a longer distance indicates a lower capacitance value. Therefore, the position of the finger of the user and the floating operation may be analyzed based on the capacitance signal.

For example, when the finger of the user is relatively far away from the touch display screen, a detected capacitance signal may be shown in FIG. 6(a). When the finger of the user is relatively close to the touch display screen, a detected capacitance signal may be shown in FIG. 6(b). Compared with a capacitance value at a position marked by a block in FIG. 6(a), a capacitance value at a position marked by a block in FIG. 6(b) is significantly increased. In addition, if a maximum capacitance value is located in the block area, it indicates that the user is relatively close to the touch display screen at the position. It may be considered that the finger of the user is located above this area of the screen, and the user may perform an operation on the mobile phone.

The processor 390 in the mobile phone 300 may determine, based on a capacitance signal generated by the floating operation of the user, whether the distance between the finger of the user and the touch display screen 340 is less than or equal to a threshold. Generally, when the finger of the user is very close to the touch display screen 340 of the mobile phone 300, the user is more likely to use the mobile phone 300. Therefore, when determining that the distance between the finger of the user and the touch display screen 340 is less than or equal to the threshold, the processor 390 may control the touch display screen 340 to display the fingerprint recognition identifier, so that the user can perform fingerprint recognition in the area to unlock the screen.

For example, when it may be predetermined that the distance between the finger of the user and the touch display screen 340 is a preset distance threshold, the touch display screen 340 generates a value of a capacitance signal at the position of the finger of the user, and uses the capacitance value as a preset threshold. When determining that there is a capacitance value greater than or equal to the preset threshold in the capacitance signal of the touch display screen 340, the processor 390 determines that the distance between the finger of the user and the touch display screen 340 is less than or equal to the threshold, and displays the fingerprint recognition identifier in the area in which fingerprint recognition can be performed.

In addition, the processor 390 in the mobile phone 300 may determine, based on the capacitance signal generated by the floating operation of the user, whether a movement direction, of the finger of the user, that is relative to the touch display screen 340 meets the preset condition. For example, if the finger of the user slides from an area far away from the area in which fingerprint recognition can be performed toward the area in which fingerprint recognition can be performed, it is determined that the operation of the user meets the preset condition. In other words, it is considered that the user intends to unlock the screen through fingerprint recognition. In this case, the processor 390 may control the touch display screen 340 to display the fingerprint recognition identifier in the area in which fingerprint recognition can be performed, so that the user can perform fingerprint recognition in the area to unlock the screen.

Figure 8:
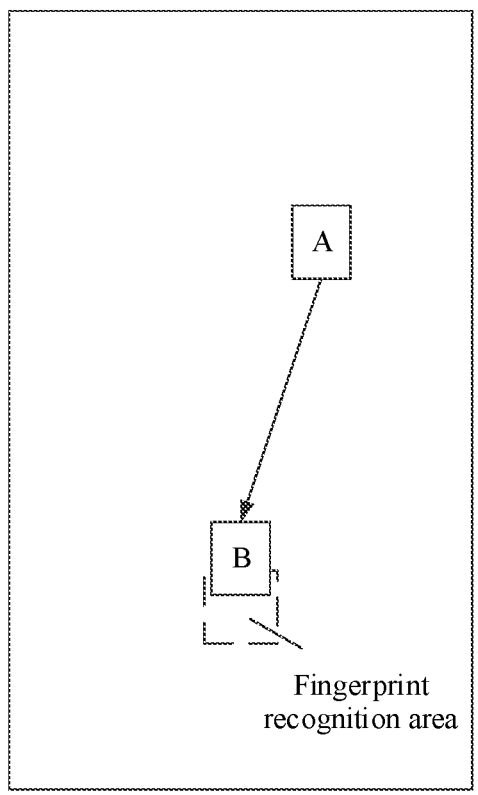
FIG. 8 is a schematic diagram of a movement direction of a finger of a user according to an embodiment of this application.

Specifically, when determining a movement direction that is of the user and that is relative to the touch display screen 340, the processor 390 in the mobile phone 300 may determine the movement direction of the finger of the user based on a change in the capacitance signal detected by the touch display screen 340 within a specific time period. For example, if a capacitance signal shown in FIG. 7 is detected at a moment t1, and a capacitance signal detected 0.5 seconds later is shown in FIG. 6(b), it may be considered that the movement direction, of the finger of the user, that is above the screen is shown in FIG. 8, and the finger slides from a point A to a point B. Because a distance from the point A to the fingerprint recognition area is greater than a distance from the point B to the fingerprint recognition area, it is determined that the finger of the user slides from an area far away from the fingerprint detector to an area close to the fingerprint detector. In this case, it may be considered that the user intends to unlock the screen through fingerprint recognition. Therefore, the processor 390 in the mobile phone 300 controls the touch display screen 340 to display the fingerprint recognition identifier, to prompt the user of the area in which fingerprint recognition can be performed, so that the user can perform fingerprint recognition in the area to unlock the screen.

It should be understood that the movement direction is merely an example in this embodiment of this application, and the preset condition may further include another preset movement direction. This is not limited in this embodiment of this application.

Optionally, the preset condition may include that a distance between the user and the touch display screen 340 is less than or equal to a preset threshold, and further include that the movement direction that is of the user and that is relative to the touch display screen 340 meets the preset condition. In other words, the user needs to meet that the distance between the finger and the touch display screen 340 within a preset range, and makes a gesture that meets the preset condition.

In addition, the non-contact operation further includes sound control and the like. In a possible implementation, the processor 390 in the mobile phone 300 may further receive an audio signal of the user through an audio circuit, and display the fingerprint recognition area for the user when the audio signal meets the preset condition. Optionally, when a voice activation manner is used, the integrated circuit of the touch display screen may be in the power-off state. Certainly, the integrated circuit of the touch display screen may not be powered off. To be specific, when the mobile phone 300 is screen-locked, the mobile phone 300 may control, based on a voice of the user, displaying the fingerprint recognition area, or may display the fingerprint recognition area based on an operation of the user on the touch display screen.

In a possible implementation, the processor 390 in the mobile phone 300 may further perform the step 402 when determining that a contact operation of the user on the touch display screen 340 meets the preset condition. To be specific, the touch display screen 340 is controlled to display the fingerprint recognition identifier in the area in which fingerprint recognition can be performed, so that the user can perform fingerprint recognition.

Specifically, in this manner, the touch display screen still needs to detect the operation of the user when the screen is locked. Therefore, the integrated circuit of the touch display screen is not powered off.

Optionally, the processor 390 in the mobile phone 300 may determine, based on a signal generated by the operation of the user on the touch display screen 340, whether the touch operation of the user meets the preset condition. Currently, the capacitive touch display screen has become a mainstream mobile phone screen. Therefore, for a mobile phone provided with a capacitive touch display screen, a processor may determine, based on a capacitance signal of the touch display screen, whether a touch operation of the user meets a preset condition.

In some embodiments, the user is in contact with the touch display screen 340. In other words, the preset condition is met. Specifically, if the touch display screen 340 is a capacitive screen, the processor 390 may determine, based on the capacitance signal of the touch display screen 340, whether the user has performed the touch operation on the touch display screen 340. For example, for the self capacitive touch display screen, after the user touches the screen, a capacitance value of a touch area increases. For the mutual capacitive touch display screen, after the user touches the screen, a capacitance value of a touch area decreases. The processor 390 may determine, based on a change in the capacitance value, whether the user is in contact with the touch display screen 340.

In some other embodiments, the preset condition may include that an area in which the finger of the user is in contact with the touch display screen 340 is within the preset area. For example, to save power, when the screen is locked, the mobile phone 300 may perform scanning detection on only a part of the touch display screen. In other words, the operation of the user can be recognized in an area in which scanning detection is performed, and the operation of the user cannot be detected in another area that is in a non-working state. The scanning detection area may include the area in which fingerprint recognition can be performed. For example, if the fingerprint detector is disposed in a lower half area of the touch display screen, only the lower half area of the touch display screen may be scanned and detected when the screen is locked. If the user touches the lower half area of the screen, it may be considered that the user intends to unlock the screen, and the fingerprint recognition identifier is displayed in the area in which fingerprint recognition can be performed. If the user touches an upper half area of the screen, because the upper half area is in a non-working state and the operation of the user cannot be detected, the fingerprint recognition area is not displayed.

It should be understood that the division of the area is merely a specific embodiment. In actual application, the preset area may be set based on different scenarios and different user requirements.

In some other embodiments, the preset condition may also include a quantity of times that the user taps the touch display screen, a sliding gesture of the user on the touch display screen, or the like. For example, if the user taps the touch display screen twice, the fingerprint recognition identifier is displayed for the user. For another example, if the finger of the user slides from an area far away from the fingerprint recognition area to the fingerprint recognition area on the touch display screen, the fingerprint recognition area is displayed for the user. Specifically, the processor may determine the sliding operation of the user on the touch display screen 340 based on the capacitance signal of the touch display screen 340. A determining method is similar to the foregoing determining of the floating operation, but a change in a capacitance value generated by the floating operation may be different from a change in a capacitance value generated by the contact operation.

Further, the preset condition may include a plurality of preset conditions. When the operation of the user meets the plurality of preset conditions, it is considered that the user intends to unlock the screen, and the fingerprint recognition area is displayed for the user. For example, if the user double-taps the screen, and a double-tap area is located in the lower half area of the touch display screen, the processor 390 in the mobile phone 300 controls the touch display screen to display the fingerprint recognition area.

As described above, the capacitive touch display screen may include the self capacitive touch display screen and the mutual capacitive touch display screen. A horizontal electrode array and a vertical electrode array are also disposed on the mutual capacitive touch display screen. When the finger touches the capacitive screen, coupling between two electrodes near a touch point is affected, thereby changing a capacitance between the two electrodes. Because the mutual capacitive touch display screen can implement multi-point detection, the mutual capacitive touch display screen is more widely applied. The foregoing detecting, based on the capacitance signal, whether the contact operation of the user meets the preset condition can be implemented by both the self capacitive touch display screen and the mutual capacitive touch display screen, but a change in a capacitance value before and after a touch on each screen is different.

In addition, the touch display screen not only includes the capacitive touch display screen, but also includes a resistive touch display screen, a touch display screen using a vector pressure sensing technology, a touch display screen using an infrared technology, a touch display screen using a surface acoustic wave technology, and the like. In different types of touch display screens, it may also be determined, according to a working principle of each touch display screen, whether a contact area between the user and the touch display screen is within a preset range, and further, whether the fingerprint recognition area is displayed for the user.

Further, for a mobile phone that can detect both a contact operation and a non-contact operation on a touch display screen, a manner of detecting the non-contact operation and the contact operation may also be used on the mobile phone, to display a fingerprint recognition distinguishing area to the user.

Optionally, the contact operation of the user on the mobile phone 300 may further include a key operation. For example, an on/off key and/or a volume key are on a side of the mobile phone 300. The processor 390 in the mobile phone 300 may alternatively display the fingerprint recognition area to the user when determining that the key operation of the user meets the preset condition. The preset condition may be that the user presses the on/off key, the user presses the volume key, or the user simultaneously presses a volume-up key and a volume-down key. In a specific embodiment, when the mobile phone 300 is in the screen-locked state, if the processor 390 in the mobile phone 300 detects that the user presses the on/off key, the processor 390 controls the touch display screen 340 to display the fingerprint recognition identifier in the area in which fingerprint recognition can be performed. As described above, when a conventional mobile phone is in a screen-locked state, a fingerprint detector is in a working state.

In the embodiments provided in this application, the fingerprint detector in the mobile phone may also be continuously in the working state when the mobile phone is in the screen-locked state, so that when the user is familiar with the fingerprint recognition area of the terminal, even if the mobile phone does not display the fingerprint recognition area, the user may directly place the finger in the fingerprint recognition area to perform fingerprint recognition, to simplify the operation of the user. In some other embodiments, when the mobile phone 300 is in the screen-locked state, the fingerprint detector in the mobile phone 300 may also be in a power-off state, namely, a non-working state. Therefore, an unlocking misoperation of the user when the user holds the mobile phone but does not use the mobile phone can be avoided. If the mobile phone unlocks the screen without the user's knowledge, more misoperations may occur. For example, a call is made by mistake. In addition, unlocking the screen by mistake consumes relatively more power.

Figure 9:
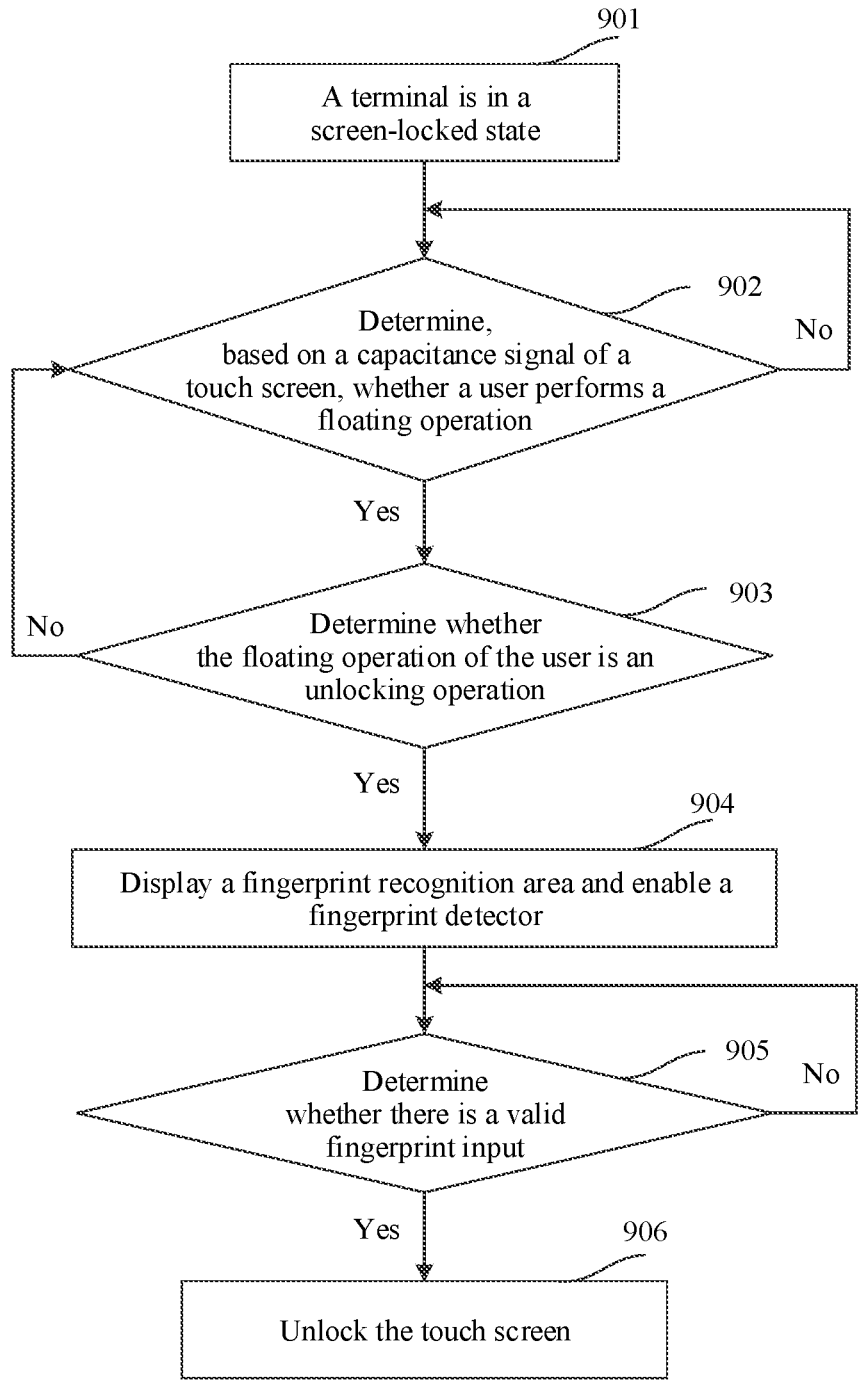
FIG. 9 is a second schematic flowchart of a fingerprint unlocking method according to an embodiment of this application.
Figure 10:
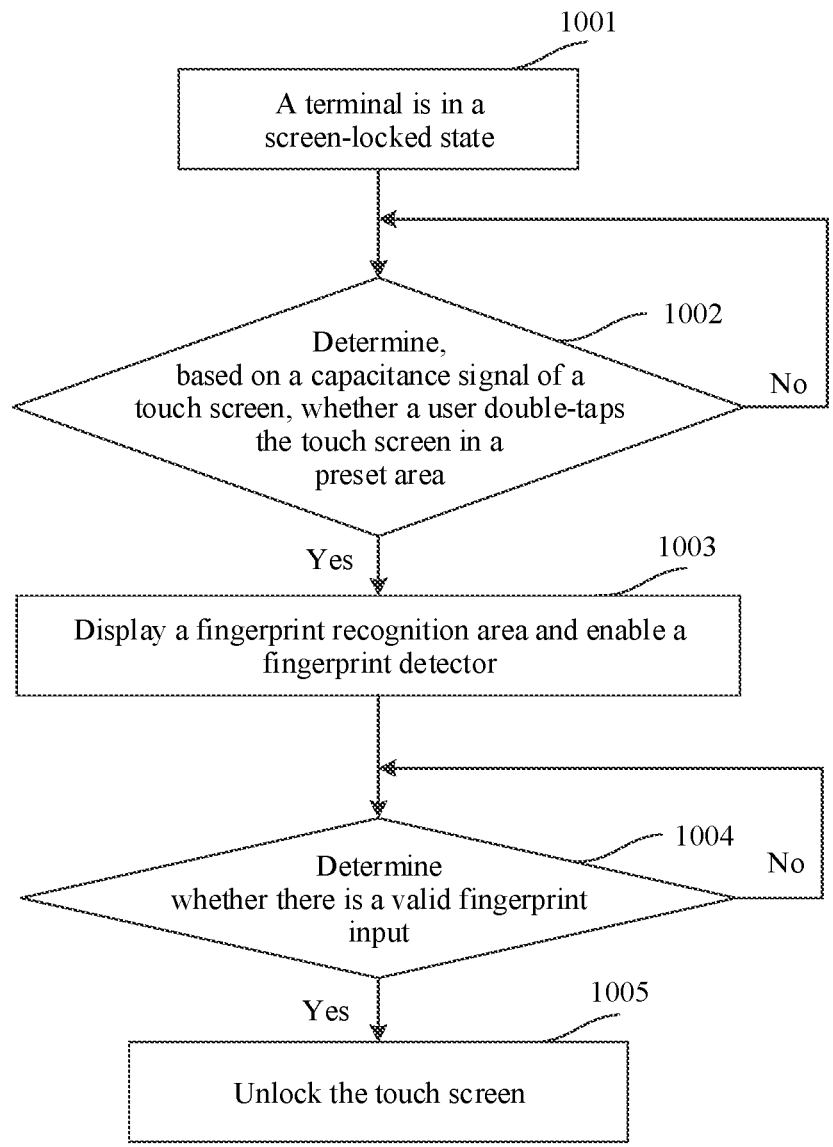
FIG. 10 is a third schematic flowchart of a fingerprint unlocking method according to an embodiment of this application.

To clearly understand the foregoing embodiments of this application, the following provides detailed descriptions with reference to FIG. 9 and FIG. 10.

FIG. 9 shows an example of a process in which a mobile phone unlocks a screen based on a gesture of a user.

Step 901: The mobile phone is in a screen-locked state.

Step 902: A processor determines, based on a capacitance signal of a touch display screen, whether the user performs an operation. If an operation of the user is detected, step 903 is performed.

Step 903: The processor determines whether a finger of the user slides from an area far away from a fingerprint recognition area toward the fingerprint recognition area, and if yes, step 904 is performed.

Step 904: The processor controls the touch display screen to display the fingerprint recognition area, and enables a fingerprint detector.

Optionally, if the fingerprint detector is always in a working state, a step of enabling the fingerprint detector is not required herein.

Step 905: The processor determines, through the fingerprint detector, whether there is a valid fingerprint input, and if yes, step 806 is performed.

Step 906: The processor unlocks the touch display screen.

FIG. 10 shows an example of a process in which a mobile phone unlocks a screen based on a contact operation of a user on a touch display screen.

Step 1001: The mobile phone is in a screen-locked state.

Step 1002: The processor determines, based on a capacitance signal of the touch display screen, whether the user double-taps the touch display screen in a preset area, and if yes, step 1003 is performed.

Step 1003: The processor controls the touch display screen to display a fingerprint recognition area, and enables a fingerprint detector.

Optionally, if the fingerprint detector is always in a working state, a step of enabling the fingerprint detector is not required herein.

Step 1004: The processor determines, through the fingerprint detector, whether there is a valid fingerprint input, and if yes, step 905 is performed.

Step 1005: The processor unlocks the touch display screen.

Based on a same technical concept, an embodiment of this application further provides a terminal, to implement the foregoing method embodiments. A structure of the terminal may be shown in FIG. 3, but is not limited to the terminal shown in FIG. 3. The terminal may include a processor, a touch display screen, and a fingerprint detector. The fingerprint detector is built in the terminal.

The processor is configured to:

when the terminal is in a screen-locked state, determine whether an operation of a user meets a preset condition; and if the operation of the user meets the preset condition, control the touch display screen to display a fingerprint recognition identifier, where a display area of the fingerprint recognition identifier is an area in which fingerprint recognition can be performed.

In a possible implementation, the operation of the user is that the user touches the touch display screen or performs a floating operation on the touch display screen.

The processor is specifically configured to:

determine, based on a capacitance signal generated by the operation of the user on the touch display screen, whether the capacitance signal is greater than or equal to a capacitance value of a preset threshold, or is less than or equal to the capacitance value of the preset threshold.

In a possible implementation, the operation of the user is that the user performs a floating operation on the touch display screen.

The processor is specifically configured to:

determine, based on a capacitance signal generated by the operation of the user on the touch display screen, whether a distance between a finger of the user and the touch display screen is less than or equal to a preset threshold.

In a possible implementation, the operation of the user is that the user touches the touch display screen.

The processor is specifically configured to:

determine, based on a capacitance signal generated by the operation of the user on the touch display screen, whether an area in which a finger of the user touches the touch display screen is in a preset area, where the preset area is the area in which fingerprint recognition can be performed.

In a possible implementation, the operation of the user is that the user touches the touch display screen or performs a floating operation on the touch display screen.

The processor is specifically configured to:

determine, based on a capacitance signal generated by the operation of the user on the touch display screen, whether a finger of the user slides from an area far away from the area in which fingerprint recognition can be performed toward the area in which fingerprint recognition can be performed.

In a possible implementation, the operation of the user is that an operation of the user on a phone key.

The processor is specifically configured to:

determine, by the terminal based on a signal generated by the operation of the user on the phone key, whether the user presses an on/off key or a volume key, or whether the user simultaneously presses a volume-up key and a volume-down key.

In a possible implementation, after determining that the operation of the user meets the preset condition, the processor is further configured to enable or disable a fingerprint detector.

It may be understood that, for the terminal embodiment, reference may be made to the detailed descriptions of the method embodiments, and details are not described herein again.

A person skilled in the art should understand that the embodiments of this application may be provided as a method, an apparatus, or a computer program product. Therefore, this application may use a form of a hardware embodiment or a software embodiment. In this embodiment of this application, one or more computer-usable storage media including computer-usable program code may be used. For example, a memory, a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (Compact Disc Read-Only Memory, CD-ROM), or a form of a computer program product implemented in any other form of storage medium well known in the art may be used.

Apparently, equivalent replacements, improvements, and the like made by a person skilled in the art based on the technical solutions of this application should all fall within the protection scope of this application.

What is claimed is:

1. An electronic device, comprising:
   a screen;
   one or more processors; and
   a memory coupled to the processor and for storing instructions which, when executed by the one or more processors, cause the electronic device to:
   lock the screen of the electronic device;
   detect a floating gesture of a user when the screen is locked and in response to detecting the floating gesture display a fingerprint recognition identifier in a fingerprint recognition area of the screen;
   detect a first touch gesture of the user on the fingerprint recognition identifier thereby to obtain a first fingerprint of the user, and process the first fingerprint to identify whether the first fingerprint is valid;
   unlock the screen when the first fingerprint is valid;
   detect a non-contact operation of the user;
   lock the screen of the electronic device in response to detecting the non-contact operation;
   while the screen is locked and not displaying the fingerprint recognition identifier, detect a second touch gesture of the user in the fingerprint recognition area, and process the second touch gesture to obtain a second fingerprint of the user; and
   unlocking the screen when the second fingerprint is valid.

2. An electronic device, comprising:
   a screen;
   one or more processors; and
   a memory coupled to the one or more processors and for storing instructions which, when executed by the one or more processors, cause the electronic device to:
   lock the screen of the electronic device;
   detect a first operation of a user while the screen is locked and in response to detecting the first user operation display a fingerprint recognition identifier in a fingerprint recognition area of the screen;
   detect a second operation of the user on the fingerprint recognition identifier and process to obtain a first fingerprint of the user;
   unlock the screen when the first fingerprint is valid in response to detecting the second operation;
   detect a third operation of the user;
   lock the screen of the electronic device in response to detecting the third operation;
   while the screen is locked and not displaying the fingerprint recognition identifier, detect a fourth operation of the user in the fingerprint recognition area, and process to obtain a second fingerprint of the user; and
   unlock the screen when the second fingerprint is valid.

3. The electronic device according claim 2, wherein the instructions executed by the one or more processors further cause the electronic device to:
   detect the fourth operation of the user when nothing is displayed on the screen, wherein the fourth operation is in a first area of the screen other than the fingerprint recognition area; and
   maintain the screen displaying nothing.

4. The electronic device according to claim 2, wherein the first operation is a non-contact operation.

5. The electronic device according to claim 4, wherein the non-contact operation comprises a motion sensing operation, or a floating operation.

6. The electronic device according to claim 2, wherein the second operation is a touch gesture.

7. The electronic device, according to claim 2, wherein the third operation is a non-contact operation.

8. The electronic device according to claim 2, wherein the fourth operation is a touch gesture.

9. The electronic device according to claim 2, wherein the fingerprint recognition identifier is an icon for prompting the user to perform fingerprint recognition.

10. The electronic device according to claim 2, further comprising:
    a fingerprint detector; and
    wherein the instructions which, when executed by the one or more processors, further cause the electronic device to,
    after detecting the third operation and locking the screen in response thereto, place the fingerprint detector in a working state.

11. The electronic device according to claim 2, wherein the first operation comprises pressing an on/off key or a volume key on the electronic device.

12. A non-transitory computer-readable medium including computer-executable instructions, which, when executed by a processor, cause the processor to perform a method comprising:
    locking the screen of the electronic device;
    detecting a first operation of a user when the screen is locked and in response to detecting the first user operation displaying a fingerprint recognition identifier in a fingerprint recognition area of the screen;
    detecting a second operation of the user on the fingerprint recognition identifier and processing to obtain a first fingerprint of the user;
    unlocking the screen when the first fingerprint is valid in response to detecting the second operation;
    detecting a third operation of the user;
    locking the screen of the electronic device in response to detecting the third operation;
    while the screen is locked and not displaying the fingerprint recognition identifier, detecting a fourth operation of the user in the fingerprint recognition area, and processing to obtain a second fingerprint of the user; and
    unlocking the screen when the second fingerprint is valid.

13. The computer-readable medium according to claim 12, wherein the method performed by the processor further comprises:
    detecting the fourth operation of the user on a first area when nothing is displayed on the screen, wherein the fourth operation is in a first area of the screen other than the fingerprint recognition area; and
    maintaining the screen to display nothing.

14. The computer-readable medium according claim 13, wherein the non-contact operation comprises a motion sensing operation or a floating operation.

15. The computer-readable medium according to claim 12, wherein the first operation is a non-contact operation.

16. The computer-readable medium according to claim 12, wherein the second operation is a touch gesture.

17. The computer-readable medium according to claim 12, wherein the third operation is a non-contact operation.

18. The computer-readable medium according to claim 12, wherein the fourth operation is a touch gesture.

19. The computer-readable medium according to claim 12, wherein the fingerprint recognition identifier comprises an icon for prompting the user to perform fingerprint recognition.

20. The computer-readable medium according claim 12, wherein the method performed by the processor further comprises:
    after detecting the third operation of the user and locking the screen of the electronic device in response thereto, placing a fingerprint detector in a working state, wherein the fingerprint detector is built into the electronic device.

\* \* \* \* \*

UNITED STATES PATENT AND TRADEMARK OFFICE
CERTIFICATE OF CORRECTION

PATENT NO. : 11,630,892 B2
APPLICATION NO. : 17/041998
DATED : April 18, 2023
INVENTOR(S) : Jin Zhou et al.

Page 1 of 1

It is certified that error appears in the above-identified patent and that said Letters Patent is hereby corrected as shown below:

On the Title Page

Item (56), in Column 2, under "Other Publications", Line 4, delete "DzcvReszexw" and insert -- DzcvReszcxw --.

In the Claims

In Column 16, Line 1, in Claim 3, after "according" insert -- to --.

In Column 16, Line 17, in Claim 7, delete "device," and insert -- device --.

In Column 17, Line 1, in Claim 14, after "according" insert -- to --.

In Column 17, Line 16, in Claim 20, after "according" insert -- to --.

Signed and Sealed this
Thirteenth Day of June, 2023

Katherine Kelly Vidal
*Director of the United States Patent and Trademark Office*